UNITED STATES PATENT OFFICE.

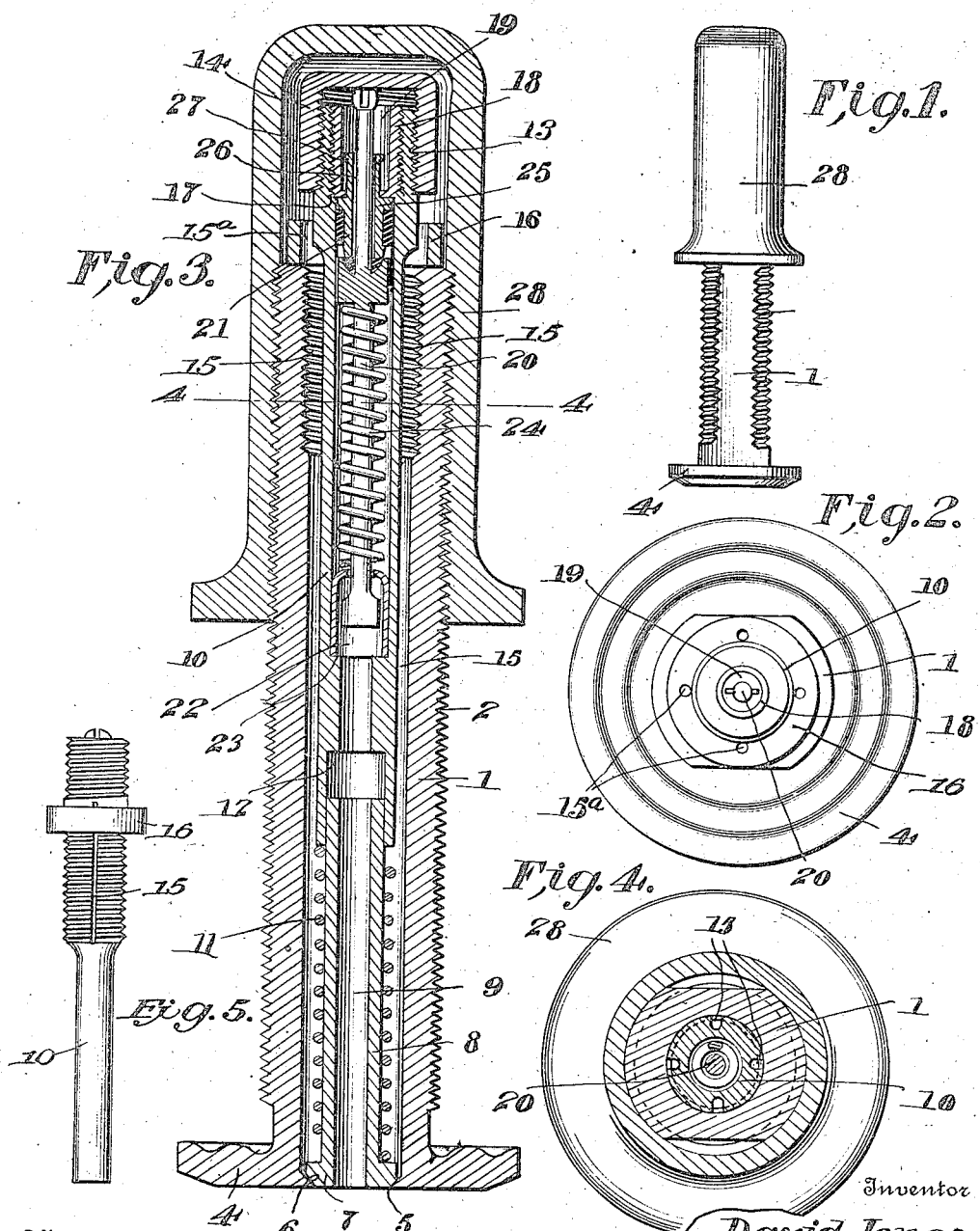
D. JONES.
PNEUMATIC TIRE VALVE.
APPLICATION FILED SEPT. 4, 1914.
1,146,882. Patented July 20, 1915.
Inventor
David Jones,
By Victor J. Evans
Attorney

DAVID JONES, OF ANACONDA, MONTANA.

PNEUMATIC-TIRE VALVE.

1,146,882.   Specification of Letters Patent.   Patented July 20, 1915.

Application filed September 4, 1914. Serial No. 860,220.

*To all whom it may concern:*

Be it known that I, DAVID JONES, a citizen of the United States, residing at Anaconda, in the county of Deerlodge and State of Montana, have invented new and useful Improvements in Pneumatic-Tire Valves, of which the following is a specification.

This invention relates to improvements in valves for pneumatic tires and has particular application to a combination intake and safety valve.

In carrying out the present invention, it is my purpose to provide a valve of the class described whereby air may be forced into the tire and held therein and whereby such air will be released when the pressure thereof passes a predetermined point, thereby eliminating the necessity of a gage and insuring the proper inflation of the tire.

It is also my purpose to provide a valve of the type set forth which will embrace the desired features of simplicity, efficiency and durability, which may be manufactured and marketed at a minimum expense and which will operate effectively for its intended purpose.

With the above and other objects in view, the invention consists in the construction, combination and arrangement of parts hereinafter set forth in and falling within the scope of the claims.

In the accompanying drawing; Figure 1 is a view in side elevation of a valve constructed in accordance with the present invention. Fig. 2 is a top plan view of the valve. Fig. 3 is a longitudinal sectional view therethrough showing the parts on an enlarged scale. Fig. 4 is a cross sectional view. Fig. 5 is a view of a detail of the invention.

Referring now to the drawing in detail, 1 designates a tubular metal casing threaded exteriorly for the major portion of its length as at 2 and having one end formed with an outwardly extending circumferential flange 4 and a centrally located opening 5, the inner wall of the open end of the casing being formed to provide a valve seat 6 concentrically of the opening 5 therein. Engaging the seat 6 is a valve disk 7 provided with an axial stem 8 extending into the casing 1 and terminating a short distance from the closed end wall of the casing. The valve disk 7 and stem 8 are formed with axially alining bores providing a fluid passage 9. The remaining end of the tubular casing 1 is open and threaded into such end is a tubular shank stem 10 coaxial with the stem 8 and having the inner end thereof telescoping over the adjacent extremity of the stem 8. Encircling the stem 8 is a coiled expansion spring 11 having one end engaging the valve disk 7 and the opposite extremity abutting the inner end of the tubular stem 10, such spring acting to hold the valve disk 7 against the seat 6 and reseat such disk after the latter has been disengaged from its seat. Formed on the inner wall of the stem 10 at a suitable distance above the adjacent end of the stem 8 is an angular shoulder 12 acting as a stop to limit the longitudinal sliding movement of the stem 8 against the action of the spring 9 under the pressure on the outer face of the valve disk 7. The inner and outer end portions of the stem 10 are circumferentially reduced and the outer end portion of such stem is threaded externally as at 13 to receive a cap 14 whereby the outer end of the stem may be closed. The relatively large central portion of the stem 10 in engagement with the adjacent portion of the inner wall of the casing 1 is formed with a number of longitudinal passages 15 opening onto the outer end of such enlarged portion of the stem so that communication may be established between the opening 5 and the atmosphere by means of the annular passage formed between the outer walls of the stems 8 and 10 and the longitudinal passages 15. Formed on the stem 10 at the juncture of the circumferentially reduced outer end portion thereof with the large central portion is an annular flange 16 designed to abut the upper end edge of the casing 1 when the stem 10 is threaded into such casing so as to limit the inward movement of the stem. Formed in the flange 16 are openings 15$^a$ corresponding to the passages 15 in the central portion of the stem 10 and forming continuations of the respective passages 15. Formed on the inner wall of the stem 10 adjacent to the outer end thereof is an annular shoulder 17 and seated upon the shoulder 17 is a plug 18 formed with a bore 19 coaxial with the stem 10 and passed through the bore 19 is a shank 20 formed, at a point approximately centrally of its length, with a valve disk 21 adapted to seat against the inner side of the plug 18 to close the bore 19 therein. Loosely mounted upon the inner end of the shank 20 is a block 22 resting upon an annular shoulder 23 formed upon the inner wall of the stem 10 above the shoulder 12 thereon, and surrounding the shank 20 between the block 22 and the valve disk 21 is a coiled expansion spring 24 having one end in engagement with the block and the opposite extremity abutting the plug, such spring acting to hold the block and valve disk spaced apart the maximum distance and the valve disk in engagement with the inner end of the plug 18 to close the bore 19 therein. Threaded into the outer end of the stem 10 is a closure plug 25 formed with an axial bore 26 to accommodate the outer end of the shank 20, the confronting ends of the closure plug 25 and the plug 18 being preferably loosely connected as at 27.

In practice, the flanged end of the casing 1 is inserted within the tire and secured to the latter in the usual well known manner and a cap 28 threaded onto the casing to inclose the latter and so prevent the entrance of dust to the interior of the casing by way of the passages 15.

When it is desired to inflate the tire, the cap 28 and the cap 14 are removed and the outer end of the stem 10 connected up with a suitable source of air pressure. The air valve is now opened and the air forces the valve disk 21 away from the adjacent end of the plug 18 against the action of the spring 24 and so passes through the axially alining bores or passages in the stems 10 and 8 and into the tire. When the pressure in the tire rises to the predetermined point, determined by the tension of the spring 11, such air pressure acting upon the inner face of the valve disk 7 forces the latter away from the seat 6 against the action of the spring 11 and so permits the excess air pressure to pass to the atmosphere by way of the annular space between the outer walls of the stems 8 and 10 and the inner wall of the casing 1 and the passages 15. When the relief or safety valve opens the person controlling the air supply is advised that the tire has been filled to its capacity and may now disconnect the air hose and reapply the caps 14 and 28. When the cap 14 is threaded onto the outer end of the stem 10 to its greatest extent the inner edge of such cap closes the outer ends of the passages 15.

From the foregoing description taken in connection with the accompanying drawing, the construction, mode of operation and manner of employing my improved combination valve will be readily apparent. It will be seen that I have provided a combined safety and intake valve for pneumatic tires and similar devices whereby the air within the tire is held therein and whereby the excess pressure pumped into the tire is released.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. In a valve of the class described, a tubular casing having one end formed centrally with an opening, and a valve seat concentrically of said opening, a valve disk engaging said seat, a stem connected to said disk and extending into the casing concentrically of the axis thereof and formed with a bore alining with an opening in the valve disk to form a fluid passage, a second stem within said casing coaxial with the first stem and having the inner end thereof telescopically receiving the inner end of said first stem and the outer end thereof projecting beyond the open end of said casing, an inlet valve within said second stem, and means holding said first valve normally against its seat.

2. In a valve of the class described, a tubular casing having one end formed centrally with an opening, and a valve seat concentrically of said opening, a valve disk engaging said seat, a stem connected to said disk and extending into the casing concentrically of the axis thereof and formed with a bore alining with an opening in the valve disk to form a fluid passage, a second stem within said casing coaxial with the first stem and having the inner end thereof telescopically receiving the inner end of said first stem and the outer end thereof projecting beyond the open end of said casing, an inlet valve within said second stem, and an expansion spring surrounding said first stem and having one end abutting said valve disk and the opposite end engaging the adjacent extremity of said last stem and acting to hold said valve disk normally in engagement with the seat.

3. In a valve of the class described, a tubular casing having one end formed centrally with an opening, and a valve seat concentrically of said opening, a valve disk engaging said seat, a stem connected to said disk and extending into the casing concentrically of the axis thereof and formed with a bore alining with an opening in the valve disk to form a fluid passage, a second stem within said casing coaxial with the first stem and having the inner end thereof telescopically receiving the inner end of said first stem and the outer end thereof projecting beyond the open end of said casing, an inlet valve within said second stem, means holding said first valve normally against its seat, and means for limiting the longitudinal movement of said first stem in the unseating of said valve disk.

4. In a valve of the class described, a tubular casing having one end formed centrally with an opening, and a valve seat concentrically of said casing, a valve disk engaging said seat, a stem connected to said disk and extending into the casing concentrically of the axis thereof and formed with a bore alining with an opening in the valve disk to form a fluid passage, a second stem within said casing coaxial with the first stem and having the inner end thereof telescopically receiving the inner end of said first stem and the outer end thereof projecting beyond the open end of said casing, an inlet valve within said second stem, means holding said first valve normally against its seat, and a shoulder on the inner face of said second stem adjacent to the proximate end of said first stem to limit the longitudinal movement of the latter in the unseating of the valve disk.

In testimony whereof I affix my signature in presence of two witnesses.

DAVID JONES.

Witnesses:
HENRY J. MÜLLER,
CHAS. A. TESCHER.